United States Patent
Kho et al.

(10) Patent No.: US 9,105,015 B2
(45) Date of Patent: Aug. 11, 2015

(54) SCHEDULING EVENTS FOR MULTIPLE INVITEES

(75) Inventors: Nancy Ellen Kho, Belmont, MA (US); Bill Dang Le, Everett, MA (US); Fang Lu, Billerica, MA (US); Alaa Abou Mahmoud, Dracut, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1114 days.

(21) Appl. No.: 13/114,584

(22) Filed: May 24, 2011

(65) Prior Publication Data

US 2012/0304088 A1 Nov. 29, 2012

(51) Int. Cl.
G06F 3/048 (2013.01)
G06Q 10/10 (2012.01)

(52) U.S. Cl.
CPC .................................. *G06Q 10/109* (2013.01)

(58) Field of Classification Search
None
See application file for complete search history.

(56) References Cited

U.S. PATENT DOCUMENTS

| | | | |
|---|---|---|---|
| 6,101,480 A * | 8/2000 | Conmy et al. ................ 705/7.18 |
| 2003/0036941 A1 * | 2/2003 | Leska et al. ......................... 705/9 |
| 2006/0045029 A1 * | 3/2006 | Ethier et al. .................. 370/260 |
| 2006/0271419 A1 * | 11/2006 | O'Sullivan ........................ 705/8 |
| 2006/0293943 A1 * | 12/2006 | Tischhauser et al. ............. 705/9 |
| 2007/0250366 A1 * | 10/2007 | Nurmi ............................... 705/8 |
| 2008/0228547 A1 * | 9/2008 | Doss et al. ........................ 705/8 |
| 2008/0294482 A1 * | 11/2008 | Bank et al. ........................ 705/8 |
| 2008/0319818 A1 * | 12/2008 | Gurdin et al. ..................... 705/8 |
| 2009/0006161 A1 * | 1/2009 | Chen et al. ........................ 705/8 |
| 2009/0018878 A1 * | 1/2009 | Baron et al. ...................... 705/7 |
| 2009/0037843 A1 * | 2/2009 | Dong et al. .................... 715/810 |
| 2009/0089133 A1 | 4/2009 | Johnson et al. |
| 2009/0125818 A1 * | 5/2009 | Ritter et al. ................... 715/753 |
| 2009/0171734 A1 * | 7/2009 | Callanan et al. .................. 705/8 |
| 2009/0265203 A1 * | 10/2009 | Marcus et al. .................... 705/8 |
| 2009/0292550 A1 * | 11/2009 | Ly ..................................... 705/1 |
| 2010/0180211 A1 * | 7/2010 | Boyd ............................ 715/751 |
| 2010/0198648 A1 * | 8/2010 | Bank et al. ........................ 705/9 |
| 2011/0015961 A1 * | 1/2011 | Chan ................................. 705/9 |
| 2011/0054976 A1 * | 3/2011 | Adler et al. ....................... 705/9 |
| 2011/0184772 A1 * | 7/2011 | Norton et al. ................ 705/7.18 |
| 2012/0150581 A1 * | 6/2012 | McPhail ..................... 705/7.19 |

OTHER PUBLICATIONS

IBM Authors (undisclosed); Ttl: Scheduling for large numbers of meeting attendees; Aug. 10, 2006; Database: IP.COM; IP.COM No. IPCOM000138916D.

* cited by examiner

*Primary Examiner* — Boris Pesin
*Assistant Examiner* — Justin Lee
(74) *Attorney, Agent, or Firm* — Steven L. Nichols; Van Cott, Bagley, Cornwall & McCarthy P.C.

(57) ABSTRACT

Scheduling events with multiple invitees includes: identifying a plurality of invitees for an event in a calendar system having at least one processor; searching an availability associated with each of the invitees to determine a number of periods of availability in the calendar system, at least some of the invitees being available during each period of availability; creating a separate instance of the event in the calendar system for each identified period of availability; and for each invitee available during at least one of the periods of availability, assigning the invitee to one said instance of the event for which that invitee is available with the calendar system.

4 Claims, 9 Drawing Sheets

| Save and Send Invitations | Save as Draft | Check Calendar |

Calendar Entry
Type: Meeting ▼

Subject: New Sales Policies
When: Starts: Mon 7/26/2011  10:00a  EDT

—— Message ——
You have invited a large group of attendees. Would you like the system to automatically find available time slots and split your invitees into groups of meeting invitations according to availability? — 205

[ Yes ]   [ No ]

Resources: [        ] [Find Resources...]

| Description | Find Available Times | Find Available Times and Split Meeting |

The system will search for the best free time of all your invitees and assign individual invitees to meeting entries for which they are available.

305 — Please select the time frame you would like to run these meetings
- Starts: Mon. 7/26/2011
- Ends: Mon. 7/26/2011

310 — Optimize for number of meetings or total attendance:
- ● Limit to a maximum of [ 4 ] Meetings
- ○ Maximize total attendance 315 — Maximum number of invitees to each meeting?
- ○ Yes [ ] Invitees/meeting
- ● No Begin Search — 320

Results

Below is the result of the free time search and the split of your invitee list into 4 meetings. Each meeting has a date, time, and list of invitees.

Invitees with bold text are also available for other meetings. To view alternative available times for a bolded invitee, roll over the name. You may also move a bolded invitee from one meeting to another according to the availability of that invitee.

405 — { Mon. 7/26/2011   Mon. 7/26/2011   Mon. 7/26/2011   Tue. 7/27/2011
10a-11a          11a-12p          1p-2p            10a-11a
29 invitees      34 invitees      6 invitees       31 invitees

| John Doe* | James Adam | Laura Doe | Linda Merces |
| Sue Smith* | Clinton She | Young August | Tomm Carrel |
| Tommy Don | Wit Woo | Elaine Juno | John Coro |
| Jane Cirlei | Dara Chuck | Max Victor | John Smith |
| Jacky James | Tam Num | Judy Cambrid | Nancy Kool |
| Billy Chuck | GroupOf5 | Peg Charm | Bill Awky |
| Nora Draw* | Patty Burger | | Allen Lam* |

410-1            410-2            410-3            410-4

Back             Proceed to Send Invitations 415              420
400

*Fig. 4*

Results

Below is the result of the free time search and the split of your invitee list into 4 meetings. Each meeting has a date, time, and list of invitees.

Invitees with bold text are also available for other meetings. To view alternative available times for a bolded invitee, roll over the name. You may also move a bolded invitee from one meeting to another according to the availability of that invitee.

| Mon. 7/26/2011 | Mon. 7/26/2011 | Mon. 7/26/2011 | Tue. 7/27/2011 |
|---|---|---|---|
| 10a-11a | 11a-12p | 1p-2p | 10a-11a |
| 29 invitees | 34 invitees | 6 invitees | 31 invitees |
| John Doe* | James Adam | Laura Doe | Linda Merces |
| Sue Smith* | Clinton She | Young August | Tomm Carrel |
| Tommy Don | Wit Woo | Elaine Juno | John Coro |
| Jane Cirlei | Dara Chuck | Max Victor | John Smith |
| Jacky James | Tam Num | Judy Cambrid | Nancy Kool |
| | | Peg Charm | Bill Awky |
| | | | Allen Lam* |

Nora Draw is available for the following times. You may manually select a meeting below:
   07/26/2011  10a-11a  ●
   07/26/2010  1p-2p   ○
   07/27/2010  10a-11a  ○

Proceed to Send Invitations 505     400

*Fig. 5*

SCHEDULING EVENTS FOR MULTIPLE INVITEES

BACKGROUND

Aspects of the present specification relate to computerized calendar systems. In particular, the present specification relates to scheduling events for multiple invitees using a computerized calendar system.

Electronic calendar applications allow users to track scheduled events through the storage of individual calendar entries for separately scheduled events. A calendar entry may contain information about an associated scheduled event, including the date, time, location, invited participants of the event, and/or a description of the event. Calendar applications and scheduled event data are often accessible through a network connection to a server, which enhances their utility for users desiring to access calendar information from different locations.

Most electronic calendar applications allow a user to electronically notify invitees of a scheduled event. For example, a user may create a calendar entry for a meeting and indicate a number of invitees for the scheduled event. Each of the indicated invitees may then receive an electronic invitation to the scheduled event, which the invitee may then electronically accept or decline.

BRIEF SUMMARY

A method of scheduling events with multiple invitees includes: identifying a plurality of invitees for an event in a calendar system having at least one processor; searching an availability associated with each of the invitees to determine a number of periods of availability in the calendar system, at least some of the invitees being available during each period of availability; creating a separate instance of the event in the calendar system for each identified period of availability; and for each invitee available during at least one of the periods of availability, assigning the invitee to one instance of the event for which that invitee is available with the calendar system.

A method of scheduling events with multiple invitees includes: identifying a plurality of invitees for an event in a calendar system comprising at least one processor; determining in the calendar system whether a period exists during which each of the invitees is available. If it is determined that a period exists during which each of the invitees is available, the event is scheduled in the calendar system for the period during which each of the invitees is available. If it is determined that no period exists during which each of the invitees is available, the calendar system determines a number of periods of availability in the calendar system, at least some of the invitees being available during each period of availability; creates a separate instance of the event in the calendar system for each identified period of availability with the calendar system; and for each invitee available during at least one of the periods of availability, assigns the invitee to one instance of the event for which that invitee is available with the calendar system.

A computerized calendar system includes a processor communicatively coupled to a memory, the memory having executable code stored thereon. The executable code, when executed by the processor, causes the processor to: identify a plurality of invitees for an event; search an availability associated with each of the invitees to determine a number of periods of availability, at least some of the invitees being available during each period of availability; create a separate instance of the event for each identified period of availability; and for each invitee available during at least one of the periods of availability, assign the invitee to one instance of the event for which that invitee is available.

A computerized calendar system includes a processor communicatively coupled to a memory, the memory having executable code stored thereon. The executable code, when executed by the processor, causes the processor to identify a plurality of invitees for an event in a calendar system comprising at least one processor and determine in the calendar system whether a period exists during which each of the invitees is available. If such a period exists during which each of the invitees is available, the executable code causes the processor to schedule the event in the calendar system for the period during which each of the invitees is available. If no period exists during which each of the invitees is available, the executable code causes the processor to: determine a number of periods of availability in the calendar system, at least one of the invitees being available during each period of availability; create a separate instance of the event in the calendar system for each identified period of availability with the calendar system; and for each invitee available during at least one of the periods of availability, assign the invitee to one instance of the event for which that invitee is available with the calendar system.

A computer program product for scheduling events with multiple invitees includes a tangible computer readable storage medium having computer readable program code embodied therewith. The computer readable program code includes: computer readable program code configured to identify a plurality of invitees for an event; computer readable program code configured to search an availability associated with each of the invitees to determine a number of periods of availability, at least some of the invitees being available during each period of availability; computer readable program code configured to create a separate instance of the event for each identified period of availability; and computer readable program code configured to, for each invitee available during at least one of the periods of availability, assign the invitee to one said instance of the event for which that invitee is available.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 2 is a diagram of an illustrative graphic user interface display for creating a scheduled event in a computerized calendar system, according to one example of principles described herein.

FIG. 3 is a diagram of an illustrative graphic user interface display for creating a scheduled event in a computerized calendar system, according to one example of principles described herein.

FIG. 4 is a diagram of an illustrative graphic user interface display for creating a scheduled event in a computerized calendar system, according to one example of principles described herein.

FIG. 5 is a diagram of an illustrative graphic user interface display for creating a scheduled event in a computerized calendar system, according to one example of principles described herein.

Throughout the drawings, identical reference numbers designate similar, but not necessarily identical, elements.

DETAILED DESCRIPTION

Figure 1:
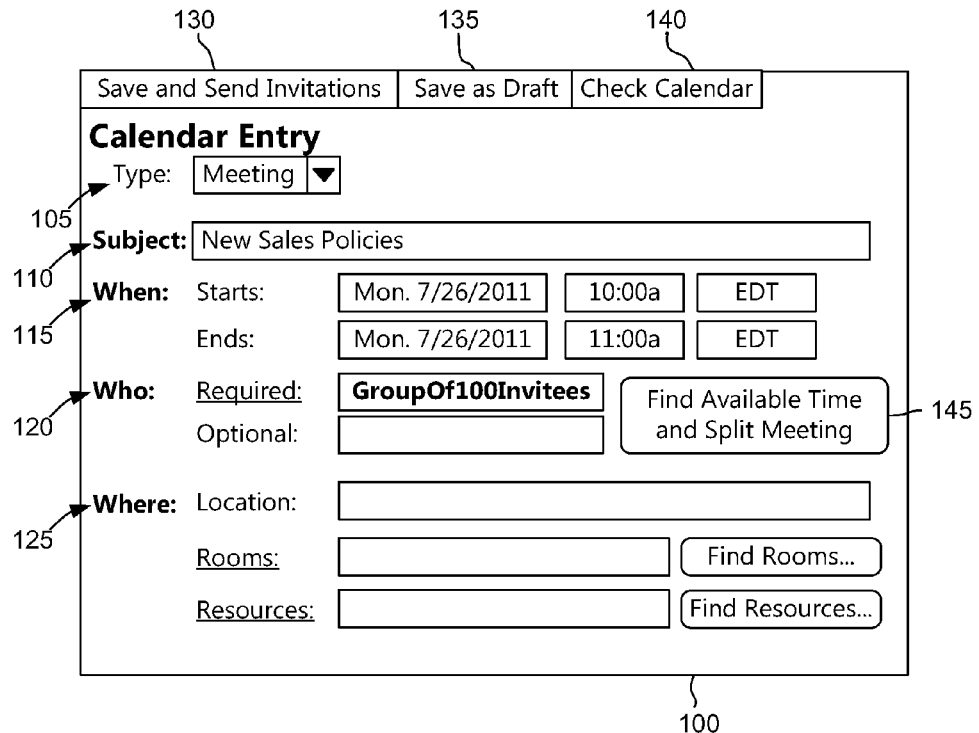
FIG. 1 is a diagram of an illustrative graphic user interface display for creating a scheduled event in a computerized calendar system, according to one example of principles described herein.

The present specification discloses methods, systems, and computer program products of scheduling events with large groups of invitees. As described above, most electronic calendar applications allow a user creating a scheduled event to electronically notify invitees of the scheduled event. In fact, some calendar applications allow the user creating the scheduled event to view the availability of the invitees. In this way, the user creating the scheduled event may be able to select a day and time for the event during which all of the invitees are available.

While this approach may be useful in smaller events having few invitees, it can be problematic when creating a scheduled event with a large group of invitees. For example, it may be difficult for a human to keep track of the availability of a significant number of invitees. Moreover, with larger groups of invitees, the likelihood of finding a period of time during which each of the invitees is available for the scheduled event is typically quite low.

In light of the aforementioned issues, the methods, systems, and computer program products disclosed in the present specification split a scheduled event with a large number of invitees into multiple instances of the event scheduled during automatically detected periods of common invitee availability. Each invitee can then be assigned to an instance of the event for which that invitee will be available.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a diagram of an illustrative graphical user interface window (100) of a computerized calendar system. The graphical user interface window (100) may be displayed to a user of the computerized calendar system through, for example, a monitor or other display device. Using the graphical user interface window (100) of FIG. 1, the user may create a new scheduled event in the computerized calendar system. As shown, the graphical user interface window (100) includes an area (105) for the user to select the type of event, an area (110) for the user to input a subject of the event, an area (115) for the user to input or modify a tentative time for the event, an area (120) for the user to indicate invitees selected for the event, and an area (125) for the user to indicate a location of the event. Additionally, the graphical user interface window (100) includes a button (130) to save the event in the computerized calendar system and send invitations to indicated attendees, a button (135) to save the event as a draft, and a button (140) allowing the user to check his or her own schedule stored by the computerized calendar system.

As shown in FIG. 1, the user may specify the invitees for the created scheduled event in the graphical user interface window (100) by inputting the name of a predefined group ("GroupOf100Invitees"). The predefined group may include an email address, a system nickname, and/or user account information for each of invitee associated with the predefined group. Additionally or alternatively, the user may specify the invitees for the created scheduled event in the window (100) individually using an email address, a system nickname, and/or other user account information.

Additionally, the graphical user interface window (100) includes a "find available time and split meeting" button (145). This button (145) may trigger the computerized calendar system to perform the function of searching an availability associated with each of the invitees specified for the scheduled event to determine a number of periods of availability. The periods of availability may be periods of time during which a significant number of the invitees are determined to be available. The computerized calendar system may be configured to find a specified number of periods of availability (i.e., the n periods of availability that maximize the number of invitees that are available during at least one of the periods of availability) or, alternatively, to find smallest number of periods of availability such that each of the invitees is available during at least one of the periods of availability.

Once the periods of availability have been determined from the availability information associated with the invitees, the computerized calendar system may split the scheduled event to create a separate instance of the event scheduled for each of the periods of availability. For each invitee available during at least one of the periods of availability, the computerized calendar system may assign that invitee to one of the created instances of the event for which that invitee is available. In this way, the availability of invitees to attend the scheduled event may be maximized. For example, if each invitee is available during at least one period of availability, each invitee may be assigned to an instance of the scheduled event for which that invitee is available.

Each of the instances of the event may be associated with the other instances of the event in the computerized calendar system. In this way, if a meeting chairperson takes one or more actions (e.g., changes location, changes description, changes time, confirms, cancels, etc.) with respect to the event generally, each of the instances of the event may be updated automatically to reflect that change.

Referring now to FIG. 2, the computerized calendar system may be configured to automatically detect that the number of invitees for a scheduled event is greater than a specified threshold and prompt the user to invoke the event splitting functionality described with respect to FIG. 1. This automatic detection of the number of invitees and prompting of the user to invoke the splitting functionality may be performed in addition to, or as an alternative to the invocation of the same functionality using the button (145, FIG. 1) shown in FIG. 1. FIG. 2 shows the graphical user interface window (100) of FIG. 1 with a popup message (205) prompting the user to invoke the event splitting functionality of the computerized calendar system following a determination that the number of invitees specified for the new scheduled event is larger than a specified threshold.

FIG. 3 is a diagram of an illustrative graphical user interface window (300) that may be displayed by the computerized calendar system to the user to allow the user to configure options for the event splitting functionality described in relation to FIGS. 1-2. This graphical user interface window (300) may be appended to the graphical user interface window (100) of FIG. 1. Additionally or alternatively, the graphical user interface window (300) of FIG. 3 may be displayed to the user separately from the graphical user interface window (100) of FIG. 1.

The user may have the option to select a period of time during which each of the periods of availability found by the computerized calendar system must fall. For example, as shown in FIG. 3, the graphical user interface window (300) may include an area (305) for the user to specify a beginning date and an ending date for the periods of availability. In some examples, the graphical user interface window (300) may also allow the user to specify a time for the start date and the end date.

The user may also be able to choose between creating a maximum total number of instances of the event and maximizing the total collective attendance of the invitees at the instances of the scheduled event. For example, as shown in FIG. 3, the graphical user interface window (300) may include an area (310) allowing the user to make this choice using radio buttons. This option may be useful given the different demographics of invitees that may be desired for different types of events scheduled through the computerized calendar system. For example, in an event with a group of 100 invitees with relatively busy schedules, 20 separately scheduled instances of the event may be required to ensure that each invitee is available for at least one of the scheduled instances. If managing 20 separately scheduled instances of the event is beyond the capacity of the user, the user may prefer to impose a cap on the total number of separately scheduled instances of the event by setting a maximum number of periods of availability to be found.

The computerized calendar system may also provide the user with the opportunity to cap the number of invitees to be assigned to each separately scheduled instance of the event corresponding to a period of availability. As shown in FIG. 3, the graphical user interface window (300) may include an area (315) allowing the user to choose whether to impose a cap on the number of invitees assigned to each instance of the event.

Once the parameters associated with the aforementioned areas (305, 310, 315) of the graphical user interface window (300) have been entered by the user, the user may select a "begin search" button (320) to instruct the computerized calendar system to proceed with determining the periods of availability, creating a separate instance of the event for each period of availability, and assigning individual invitees to each instance of the event based on availability of the invitees.

FIG. 4 is a diagram of an illustrative window (400) of the graphical user interface of the computerized calendar system that shows the results of determining periods of availability, creating a separate instance of the event for each period of availability, and assigning invitees to the instances of the event based on availability. The window (400) displays each of the periods of availability (405) found by the computerized calendar system. With each period of availability, a list (410-1 to 410-4) of invitees assigned to the instance of the scheduled event created for that period of availability is also displayed.

Some of the invitees may be available during more than one of the identified periods of availability (405). In the example of FIG. 4, these invitees are displayed in bold text with an asterisk. The computerized calendar system may allow the user to change an assignment of an invitee from one instance of the event to another instance of the event for which that invitee is available.

The graphical user interface window (400) may include navigation buttons (415, 420) that allow the user to proceed to sending electronic invitations to the invitees or return to a previous window. In certain examples, the graphical user interface window (400) may be part of or appended to another graphical user interface window, such as the graphical user interface window (100) of FIG. 1, which renders the navigation buttons (415, 420) redundant and unnecessary. In such cases, the navigation buttons (415, 420) may not be included in the graphical user interface window (400).

FIG. 5 shows the graphical user interface window (400) of FIG. 4, wherein the user is given the option of changing the assignment of one of the invitees. By selecting an invitee, the graphical user interface window (400) may provide a display (505) of each instance of the event during which that particular invitee is available and allow the user to select a new assignment for the invitee. Additionally or alternatively, the graphical user interface window (400) may permit the user to drag and drop an invitee to reassign that invitee to another instance of the event for which that invitee is available.

Once the user has seen the division of the event and the assignment of invitees in the graphical user interface window (400), the user may choose to proceed with sending electronic invitations to the invitees. In sending the electronic invitations, the user may have the option to send out a separate electronic invitation for each separately scheduled instance of the event or a single electronic invitation to each invitee which allows the invitees to select an instance of the scheduled event to attend.

Figure 6:
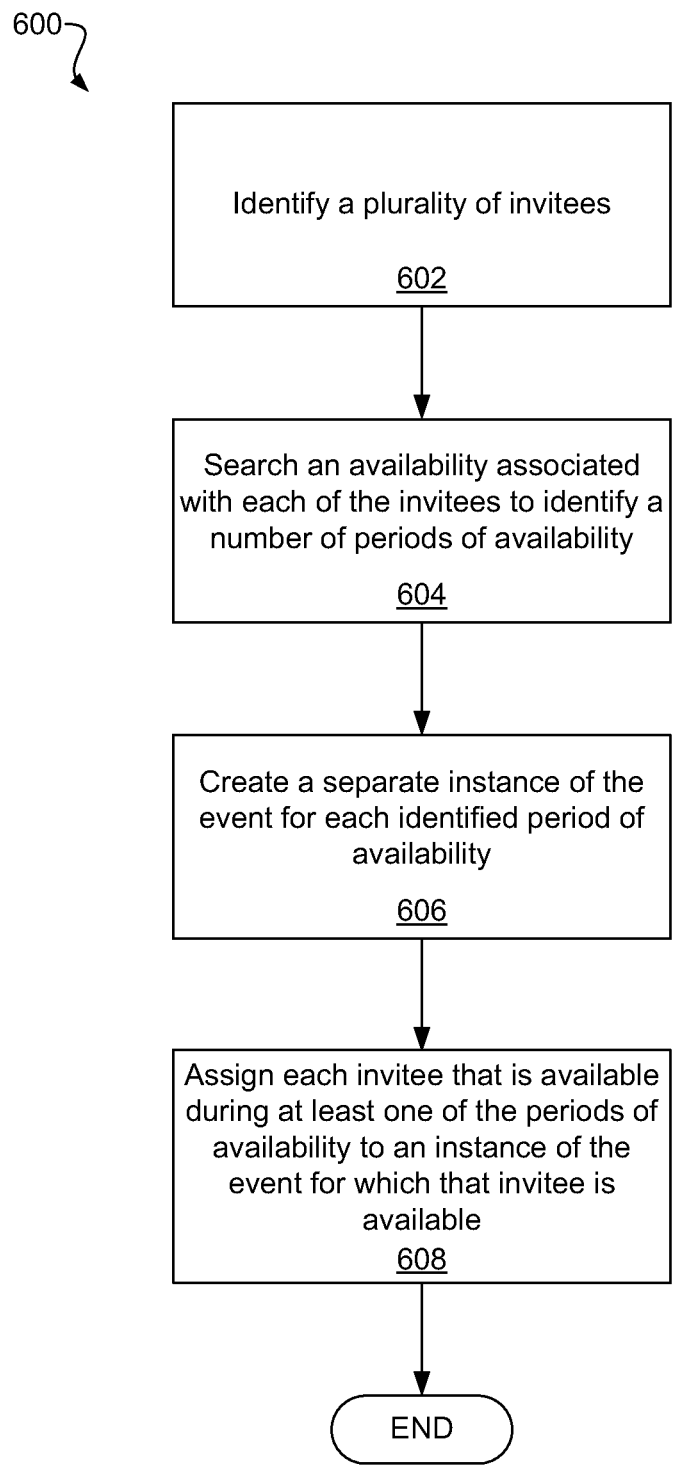
FIG. 6 is a flow diagram of an illustrative method of scheduling events with multiple invitees, according to one example of principles described herein.

FIG. 6 is a flowchart diagram of an illustrative method (600) which may be performed by a computerized calendar system to schedule events with multiple invitees. At block 602, a plurality of invitees is identified in the system. At block 604, the calendar system searches an availability associated with each of the invitees to identify a number of periods of availability, where at least one of the invitees is available during each period of availability.

In certain examples, availability information may not be explicitly associated with a particular invitee, or the invitee may have chosen to hide or obscure its availability information from the computerized calendar system. In such examples, the computerized calendar system may treat that invitee as being available during normal business hours or follow some other default availability template.

At block 606, a separate instance of the event is created in the calendar system for each identified period of availability. At block 608, each invitee that is available during at least one of the periods of availability is assigned to one instance of the event for which that invitee is available.

Figure 7:
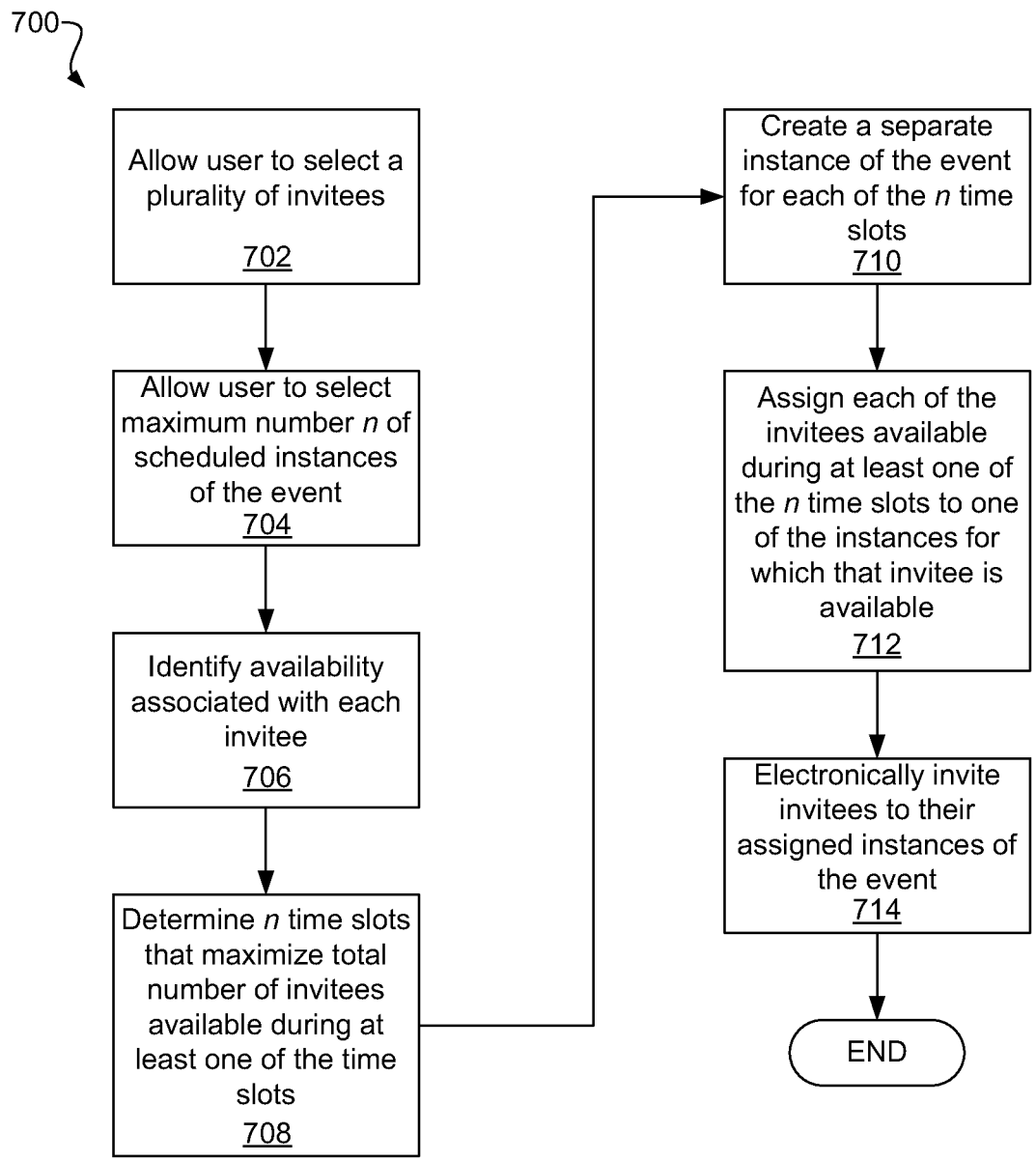
FIG. 7 is a flow diagram of an illustrative method of scheduling events with multiple invitees, according to one example of principles described herein.

FIG. 7 is a block diagram of a more specific example of an illustrative method (700) of scheduling events with multiple invitees performed by a computerized calendar system. At block 702, a user is permitted to select a plurality of invitees. At block 704, the user is permitted to select a maximum number (n) of scheduled instances of the event. At block 706, the system identifies the availability associated with each of the invitees. Proceeding to block 708, the system determines the n time slots that maximize the total number of invitees available during at least one of the time slots. These n time slots are the periods of availability determined by the system.

At block 710, a separately scheduled instance of the event is created for each of the n time slots. At block 712, each of the invitees that is available during at least one of the n time slots is assigned to one of the instances of the event corresponding to a time slot for which that invitee is available. In certain examples, a user may manually change one or more of these assignments. Finally, at block 714, each invitee assigned to one of the instances of the event is electronically invited to that instance of the event by the computerized calendar system. In certain examples, a response (e.g., accept, decline, propose new time) may be received in the computerized calendar system from one or more of the invitees and forwarded to the user creating or managing the event.

Figure 8:
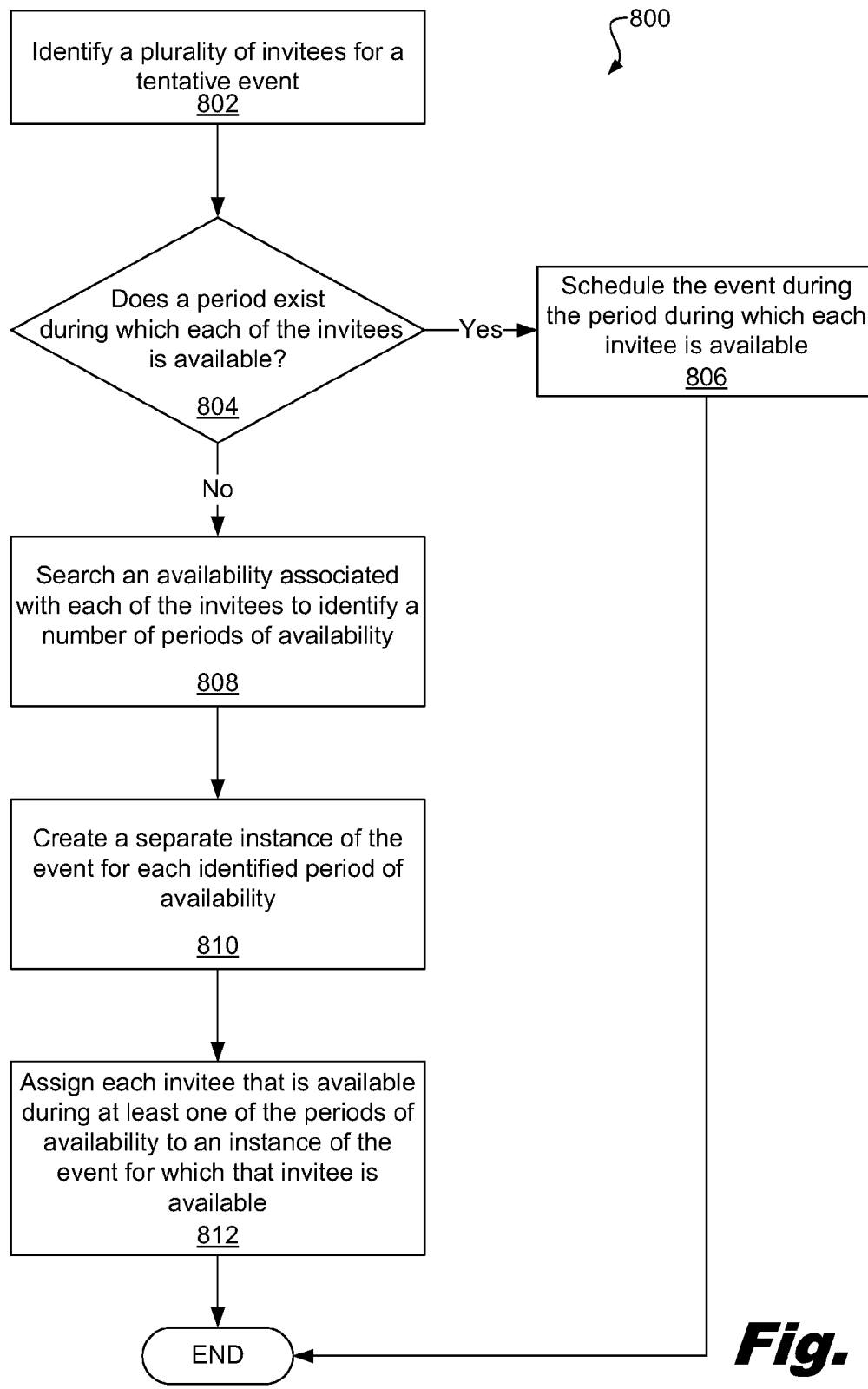
FIG. 8 is a flow diagram of an illustrative method of scheduling events with multiple invitees, according to one example of principles described herein.

FIG. 8 is a flowchart diagram of another example of a method (800) of scheduling events with multiple invitees using a computerized calendar system. At block 802, a plurality of invitees is identified for an event. A determination is made at block 804 as to whether a period of time exists during which each of the invitees is available. If such a period of time is found (block 804, YES), the event is scheduled during that period at block 806. Otherwise (block 804, NO), the availability of each invitee is searched at block 808 to identify a number of periods of availability such that at least one of the invitees is available during each period of availability. At block 810, a separate instance of the event is created for each identified period of availability, and each invitee that is available during at least one of the period of availability is assigned to an instance of the event for which that invitee is available at block 812.

Figure 9:
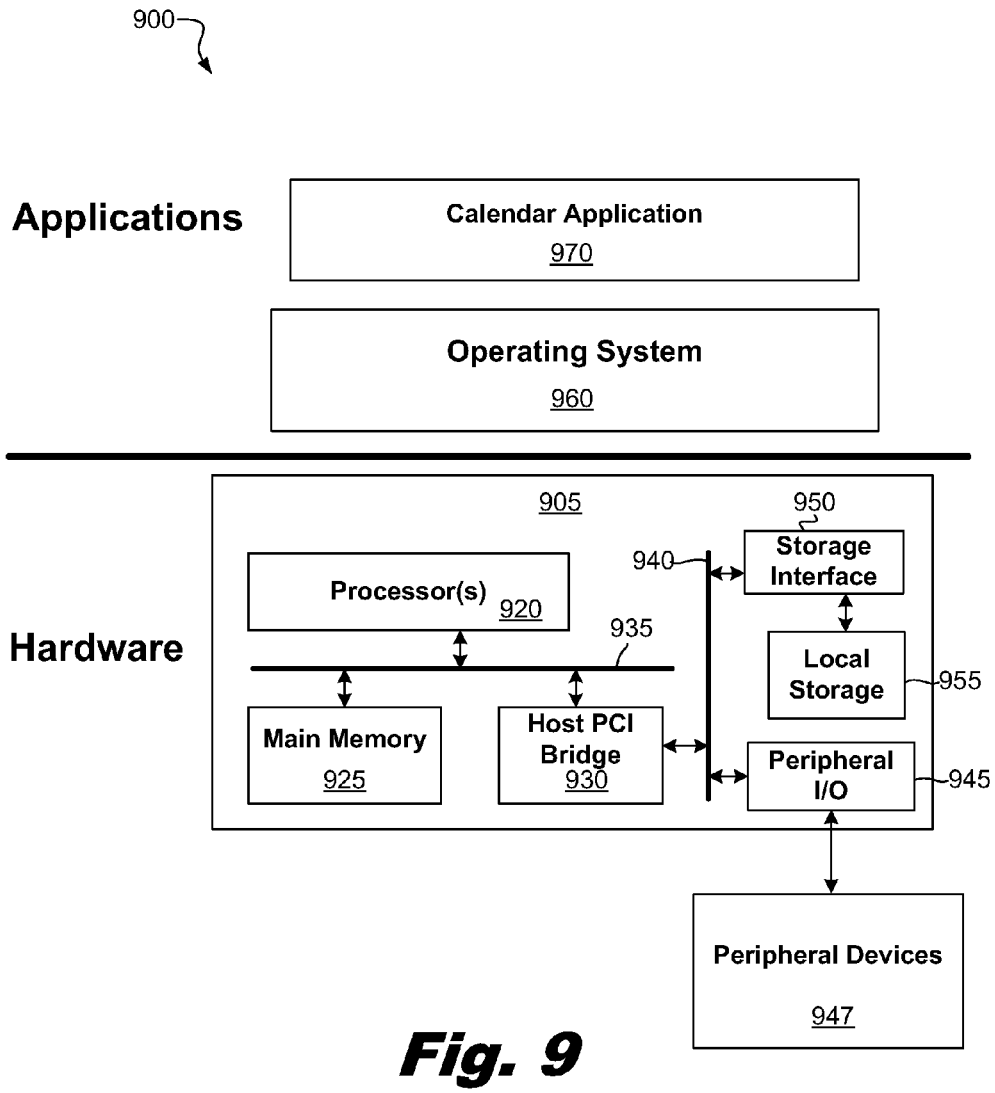
FIG. 9 is a block diagram of an illustrative computing device that may implement a computerized calendar system for scheduling events with multiple invitees, according to one example of principles described herein.

FIG. 9 is a block diagram of an illustrative computing device (900) that may be used to execute a computerized calendar program as a calendar server, a calendar client device, and/or a standalone calendar device to implement a computerized calendar system.

The hardware platform (905) of the computing device (900) may include at least one processor (920) that executes code stored in the main memory (925). In certain embodiments, the processor (920) may be a multi-core processor having multiple independent central processing units (CPUs), with each CPU having its own L1 cache and all CPUs sharing a common bus interface and L2 cache. Alternatively, the processor (920) may be a single-core processor.

The at least one processor (920) may be communicatively coupled to the main memory (925) of the hardware platform and a host peripheral control interface bridge (PCI) (930) through a main bus (935). The main memory (925) may include dynamic non-volatile memory, such as random access memory (RAM). The main memory (925) may store executable code and data that is obtainable by the processor (920) through the main bus (935).

The host PCI bridge (930) may act as an interface between the main bus (935) and a peripheral bus (940) used to communicate with peripheral device interfaces (945). Among these peripheral devices (947) that interface to the processor (920) may be a network interface controller, external human interface devices (e.g., monitor, keyboard, mouse, touch screen, speaker, microphone), other external devices (e.g., external storage, dongles, specialized tools), serial buses (e.g., Universal Serial Bus (USB)), and the like. A local storage interface (950) for communicating with local storage devices (955) may also communicate with the peripheral bus (940).

The present configuration of the hardware platform (905) is merely illustrative of one type of hardware platform (905) that may be used in connection with the principles described in the present specification. The hardware platform (905) shown in the lower half of the diagram of FIG. 9 is configured to implement the elements of application functionality shown in the upper half of the diagram of FIG. 9. Thus, as shown in FIG. 9, an operating system (960) program is executed directly by the hardware platform (905). The operating system (960) may interact with and manage the performance of hardware resources in the hardware platform (905), including the processor(s) (920), the main memory (925), and the peripheral devices (947, 955). Thus, the operating system (960) controls the execution of computer programs by the processor(s) (920). Among these computer programs may include a calendar application (970) which causes the processor(s) (920) to implement a computerized calendar system, such as the computerized calendar system described herein. As part of the execution of the calendar application (970), a user interface such as the user interfaces described in relation to FIGS. 1-5 may be displayed by one of the peripheral devices (947).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computerized calendar system, comprising:
a processor communicatively coupled to a memory, the memory comprising executable code stored thereon that, when executed by the processor, causes the processor to,
in response to determining that no single available meeting period exists during which all identified invitees are available:
display a button for splitting a meeting into multiple meetings;
in response to activation of the button, determine a number of periods of availability in the calendar system, at least one of the invitees being available during each period of availability;
create a separate instance of the event in the calendar system for each identified period of availability such that a plurality of instances of the same event are scheduled to occur at different times in the calendar system; and
for each invitee, assign the invitee to at least one said instance of the event for which that invitee is available with the calendar system.

2. The computerized calendar system of claim 1, the executable code further causing the processor to determine the number of periods of availability in the calendar system automatically in response to the amount of invitees being greater than a specified threshold.

3. The computerized calendar system of claim 1, the executable code further causing the processor to allow the user to change an assignment of a said invitee from one instance of the event to another instance of the event.

4. A computer program product for scheduling events with multiple invitees, the computer program product comprising:
a tangible, non-transitory computer readable storage medium having computer readable program code embodied therewith, the computer readable program code comprising:
computer readable program code configured to identify a plurality of invitees for an event;
computer readable program code configured to, in response to determining that no single available meeting period exists during which all identified invitees are available or that the number of invitees exceeds a threshold, display a button for splitting the event into multiple meetings;

computer readable program code configured to, in response to activation of the button, search an availability associated with each of the invitees to determine a number of periods of availability, at least one of the invitees being available during each period of availability;

computer readable program code configured to create at least one separate instance of the event based on invitee availability such that a plurality of instances of the same event are scheduled to occur at different times based on invitee availability, wherein the plurality of instances of the event are scheduled within a period of time specified by a user, and wherein all the instances of the event are associated in the calendar system such that a change made to any one of the instances results in an automatic update to the other instances of the event to reflect that change; and computer readable program code configured to, for each invitee, assign the invitee to one said instance of the event for which that invitee is available, such that a different group of invitees is assigned to each of the multiple instances of the event based on availability of individual invitees.

* * * * *